Nov. 29, 1955  R. V. WERNER  2,725,528
APPARATUS FOR DETERMINING PHASE ANGLE AND DIRECTION
Filed July 19, 1951
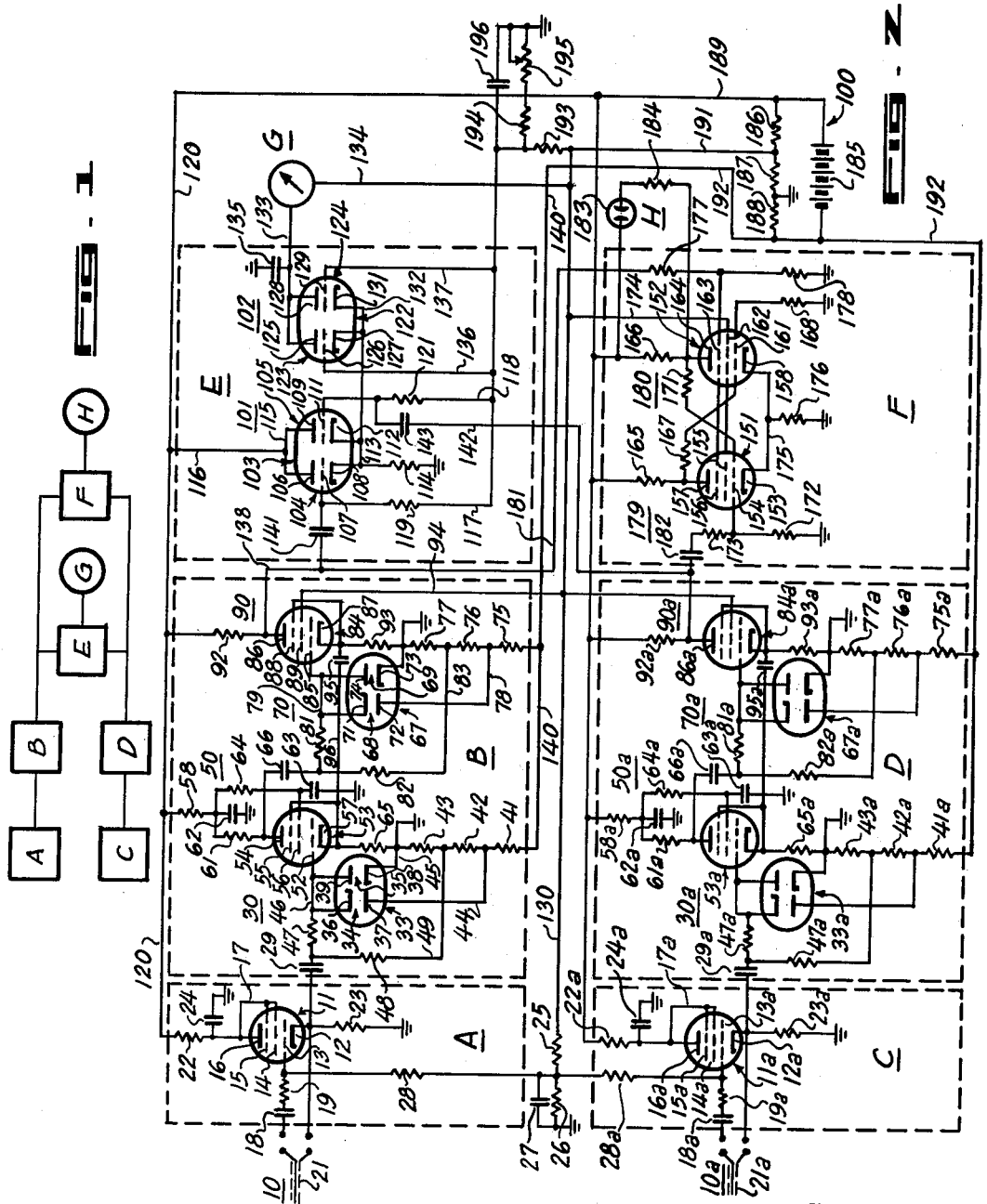
INVENTOR:
Robert V. Werner
BY
Walter J. Jason
ATTORNEY United States Patent Office 2,725,528
Patented Nov. 29, 1955

2,725,528

APPARATUS FOR DETERMINING PHASE ANGLE AND DIRECTION

Robert V. Werner, San Diego, Calif., assignor, by mesne assignments, to General Dynamics Corporation, a corporation of Delaware Application July 19, 1951, Serial No. 237,545

4 Claims. (Cl. 324—89)

This invention relates to electrical measuring circuits and more particularly to a method of and means for measuring and indicating the relative phase difference between two alternating voltages.

An object of this invention is to provide an improved means for accurately measuring the relative phase difference over wide frequency bandwidths between two alternating voltages of equal frequencies, whose amplitudes are variable over wide ranges.

Another object of this invention is to provide novel means for developing a linear variation in current which is proportional to the relative phase difference between two alternating voltages.

A further object of this invention is to provide an improved and simplified circuit for the indication of the direction of phase difference between two alternating voltages.

A further object of this invention is to provide in a circuit for measuring and indicating relative phase difference and direction between two electrical quantities means for isolating the electrical measuring circuits from the alternating voltage sources.

A further object of this invention is to provide a simplified means for rapidly and accurately measuring and indicating the relative phase difference and phase direction between two alternating voltages in a linear and direct manner.

Other objects and features of this invention will be readily apparent to those skilled in the art from the following specification and appended drawing illustrating certain preferred embodiments of this invention in which:

Figure 1 is a block diagram of an improved circuit embodying the present invention, and Figure 2 is a schematic diagram of the circuit of Figure 1.

The invention in the embodiment chosen for purposes of disclosure, as illustrated in block form in Fig. 1, comprises essentially a pair of like isolating units A and C, a pair of identical waveform shaping units B and D, a summing or computing amplifier E, a phase angle meter G, a phase direction circuit F, and a phase direction indicator H.

The term phase angle or phase difference, as used herein, denotes a time difference between two electrical quantities or signals alternating at the same frequency.

The phase difference between two voltages of the same frequency from a source or sources to be measured is rapidly and precisely determined in the circuit arrangement of the present invention by applying the signals individually to the isolating units or circuits A and C, which units prevent interaction between the measuring circuitry of the invention and the source or sources of the electrical quantities and further permits the investigation of voltages of larger amplitudes. The developed voltages of the units A and C are coupled to the waveform shaping units B and D, respectively, which convert sine wave signals into square wave signals of limited amplitude. These square wave signals generated by the waveform shaping units B and D are then applied both to the phase direction circuit F and to the summing amplifier E. The summing amplifier E serves to develop a direct current whose average value is linearly proportional to the phase difference between the square wave voltages generated by the waveform shaping units B and D. This unidirectional current provided by amplifier E is transmitted to the phase angle meter G, which is linearly calibrated in electrical degrees and displays the magnitude of phase difference. The phase direction circuit F is employed to determine the direction of any phase angle existing between the applied voltages and the indication of which is accomplished by the phase direction indicator H.

The schematic circuit diagram shown in Figure 2 illustrates in detail the nature of the circuitry of the present invention. The alternating voltages whose phase characteristics are desired are derived from a source or sources (not shown) being investigated and applied to the pair of isolating units A and C through shielded leads 10 and 10a. Since, as hereinbefore stated, isolating units A and C are of similar construction only unit A will be described in detail. Unit A, as indicated in the drawings, comprises a cathode follower circuit whose purpose is to isolate the measuring and indicating circuitry of the present invention from the source of alternating voltage by presenting a high impedance to the voltage source. This isolation characteristic of the cathode follower circuit results from an inverse feedback action developed by the circuit, to be described further hereinafter. The feedback characteristic of the cathode follower circuit permits a wide variation in amplitude of the applied alternating voltages without effecting phase or amplitude distortion in the output of unit A. The cathode follower circuit, as shown, comprises an electron tube 11 including a cathode 12, a control grid 13, a screen grid 14, a suppressor grid 15, and an anode 16. Screen grid 14, suppressor grid 15, and anode 16 are conductively connected together through a lead 17 so that tube 11, in effect, functions as a triode. Input lead 10 is preferably connected to the control grid 13 through a blocking condenser 18 and a resistor 19, which resistor is interposed to suppress parasitic oscillations of the circuit. The effective capacity of the input lead 10 is minimized by returning the cathode 12 to shield 21 afforded on lead 10. Unidirectional anode voltage is furnished the tube 11 by a power supply source 100, hereinafter to be described in detail, through an anode supply bus 120 which is connected to anode 16 through resistor 22. The cathode 12 is connected to ground through a cathode load resistor 23, across which the output voltage is developed. Connected between the common terminal of resistor 22, anode 16, and lead 17 and ground is a condenser 24, which with resistor 22 forms a decoupling or filter circuit serving to isolate the alternating currents of unit A from the anode power supply source. Grid bias voltage for tube 11 is provided from power supply source 100 through a regulated voltage bus 130. The proper value of grid bias voltage is afforded by a network comprising series resistors 25 and 26, through which resistors voltage bus 130 is connected to ground, and a condenser 27 connected between ground and the common terminal of resistors 25 and 26. The voltage which appears across resistor 26 is impressed upon control grid 13 through a grid return resistor 28.

As stated, isolating unit A and isolating unit C are similar in their components and operation. Isolating unit C, therefore, also embodies a cathode follower circuit comprised of an electron tube 11a having a cathode 12a, control grid 13a, screen grid 14a, suppressor grid 15a, and anode 16a, with the latter three elements interconnected by a lead 17a, and with cathode 12a grounded through a load resistor 23a and also having a connection to shield 21a on lead 10a. Anode supply bus 120 connects through resistor 22a to anode 16a to provide unidirectional voltage to tube 11a. To suppress parasitic oscillations resistor 19a is interposed between lead 10a and control grid 13a. Blocking condenser 18a serves to prevent direct current potentials appearing at the control grid 13a. Condenser 24a, connected in the anode circuit between resistor 22a and the terminal of lead 17a, cooperates with resistor 22a to effect a filter circuit for isolation of alternating currents of unit C from the anode power supply source 100. Series resistors 25 and 26 and condenser 27, which comprise a grid bias network and provide proper grid bias voltage for tube 11, cooperate with regulated voltage bus 130 and grid return resistor 28a to provide the required grid bias voltage for tube 11a, with the voltage impressed across resistor 26 being applied to control grid 13a of tube 11a through the resistor 28a.

In operation, the above described cathode follower circuits constituting isolating units A and C allow the application of alternating voltages which simultaneously may vary over a wide frequency bandwidth and whose amplitudes relative to each other, may vary over wide ranges. Voltage amplitudes and frequencies of this character may be applied to the control grids 13 and 13a of tubes 11 and 11a with negligible phase or amplitude distortion. For example, with circuit constants being assigned proper values, alternating voltages whose frequency bandwidth may range from 20 cycles per second to 20 kilocycles per second and each of whose peak voltage amplitudes may vary from 1 to 100 volts may be applied to the control grids 13 and 13a without distortion. In achieving this result the cathode follower circuits of units A and C act as inverse feedback amplifiers. Alternating voltages impressed upon the control grids 13 and 13a will cause linear in-phase variations in the plate current flowing in the vacuum tubes 11 and 11a. These current variations pass through the external circuit interconnecting the cathodes 12 and 12a and their associated anodes 16 and 16a resulting in voltage variations across the cathode resistors 23 and 23a which are in-phase with the voltages impressed upon the control grids 13 and 13a. Thus, as the grid voltages become more positive, the voltages across the cathode resistors 23 and 23a become more positive, or follow the grid voltages. The effective voltages applied between the control grids 13 and 13a and their respective cathodes 12 and 12a are then the differences between these voltages. Since it is the effective voltage which controls the plate current passing through the tubes 11 and 11a, the response to the magnitude of the alternating voltages applied to the grids 13 and 13a is reduced. It has been found that the grid biasing circuit, consisting of resistors 25 and 26 and condenser 27, with properly assigned values will provide sufficient bias voltage to control grids 13 and 13a through the grid return resistors 28 and 28a to allow variations in the peak input of 1 volt to 100 volts with essentially distortionless operation.

The voltages developed by the isolating units A and C, appearing across the cathode load resistors 23 and 23a, are applied to the inputs of waveform shaping units B and D, respectively, through coupling condensers 29 and 29a, which act to prevent transfer of unidirectional voltages from the isolating units to the waveform shaping units B and D.

The waveform shaping units B and D, as hereinbefore indicated, are similar units, each comprising two amplitude limiting stages, numbered 30 and 70, and two amplifier stages, denoted in the drawings by the numerals 50 and 90 (which various stages will be hereinafter described in detail), to correct the wave shape of the output voltages of the input units A and C by limiting both the positive and negative amplitudes of the applied signal. The resultant square wave outputs of the waveform shaping units B and D are of substantially equal amplitudes with sharp rising and falling leading and lagging edges, or rapid rise and fall time, and will have a minimum of distortion from a symmetrical square wave.

Since waveform shaping units B and D are similar, a detailed description will be provided only of unit B, and corresponding elements of unit D will be indicated on the drawing by like numerals having the suffix "a."

As shown in the drawings, waveform shaping unit B comprises a first limiting stage 30 consisting of a limiter tube 33 which contains in a single envelope two diodes 34 and 35, with diode 34 including a cathode 36 and an anode 37 and with diode 35 having a cathode 38 and anode 39. A negative bias voltage for the first limiting stage 30 is provided from the power supply source 100 by a bus 140 which is connected to ground through a series resistance network comprising resistors 41, 42, and 43. Anode 37 is connected by a lead 44 to the negative supply bus 140 between resistors 41 and 42 with cathode 38 being connected to ground by a lead 45. Cathode 36 and anode 39 are interconnected by the common lead 46, which is connected to coupling condenser 29 through a series dropping resistor 47. The common terminal of coupling condenser 29 and resistor 47 is connected to bus 140 through a grid return resistor 48 by a lead 49.

The function of the double diode limiting stage 30, above described, is to remove by electronic means the positive and negative extremities of the signal voltage applied. In operation, the biasing network comprising the resistors 41, 42, and 43, through which the negative bias bus 140 is connected to ground, in combination with the grid return resistor act to establish the level at which the input signal voltage will be clipped. For example, the bias voltage applied to diode 34, which is the voltage existing across resistor 42, results in a negative voltage being applied to the anode 37 of diode 34. The bias voltage applied to the diode 35 is the voltage appearing across the biasing resistor 43. With the magnitude of the resistors 42 and 43 being preferably equal, the positive bias voltage applied to the cathode 38 of diode 35 is then equal to the negative bias impressed upon the anode 37 of diode 34. Until the amplitude of the sinusoidal voltage developed by the isolating unit A and coupled to the double diode limiting stage by the condenser 29 equals the negative bias voltage applied to anode 37 of diode 34 this voltage passes through limiting stage 30 unaffected. However, when this voltage has built up in the negative direction from its zero reference level to a value equal to the negative bias voltage applied to diode 34 this diode becomes conductive and current then flows through the series dropping resistor 47 and the diode 34. The value of the series dropping resistor 47 is made large compared to the resistance of diode 34 when conductive, in order that it result in essentially the entire voltage appearing across resistor 47. When the sinusoidal voltage coupled to the limiting stage 30 builds up in the positive direction to a magnitude equal to the positive bias voltage impressed upon the cathode 38 of diode 35, diode 35 becomes conductive with the resultant current flow through the series dropping resistor 47 and diode 35 resulting in essentially the entire positive voltage appearing across resistor 47. Thus, the voltage actually developed by the double diode limiting stage 30 is the voltage which appears across the diodes 34 and 35, i. e., the clipped input voltage below the positive and negative limits established by the bias voltages supplied to the diodes 34 and 35.

The symmetrically limited signal appearing at the output of the limiting stage 30 is now fed to an amplifying stage 50 for the purpose of linearly amplifying the clipped signal. In this operation the clipped voltage appearing across diodes 34 and 35 is impressed upon control grid 52 of a pentode amplifier tube 53. Amplifier tube 53, in addition to control grid 52, includes an anode 54, a suppressor grid 55, a screen grid 56 and a cathode 57, with suppressor grid 55 being interconnected with the cathode 57. Anode 54 is connected to the power supply source 100 by the anode voltage supply bus 120 through a decoupling resistor 58 and a load resistor 61. A bypass condenser 62 is conductively connected between the junction of the resistors 58 and 61 and ground. The combined action of resistor 58 and bypass condenser 62 forms a decoupling network which isolates any alternating currents from the power supply source 100. To the screen grid 56, which is bypassed to ground by a condenser 63, a unidirectional voltage is supplied by a connection to the anode voltage supply bus 120 through a dropping resistor 64 and the decoupling resistor 58. The cathode 57 is connected to ground through an unbypassed cathode resistor 65. The voltage variations supplied by the initial limiting stage 30 to the control grid 52 of tube 53 results in a linear, in-phase variation in current flowing from the anode voltage supply bus 120 through resistors 58 and 61, the tube 53, and the cathode resistor 65 to ground. The voltage developed across the unbypassed cathode resistor 65 is, therefore, in-phase with the applied voltage and provides a current feedback action which results in a flat frequency response characteristics for the linear amplifier 50. The variations in current flowing from the anode voltage supply bus 120 through resistor 58 and load resistor 61, in response to the voltage applied to the control grid by the limiting stage 30, cause 180 degree phase variations in the potential appearing at the anode 54, which potential variations are coupled through a coupling condenser 66 to a second double diode limiting stage 70.

The second double diode limiting stage 70 comprises a vacuum tube 67, which contains in a single envelope, two diodes 68 and 69, with the diode 68 including a cathode 71 and an anode 72 and with the diode 69 including a cathode 73 and an anode 74. Biasing voltage is supplied limiting stage 70 by the power source 100 through the negative bias bus 140, which bus, as shown, is connected to ground through a series resistance circuit comprising resistors 75, 76, and 77. The anode 72 of diode 68 is connected by a lead 78 to bus 140 between resistors 75 and 76, whereby the negative voltage developed across resistors 76 and 77 is applied to anode 72. Cathode 71 of diode 68 and anode 74 of diode 69 are connected by a common lead 79 to the condenser 66 in amplifying stage 50 through a series dropping resistor 81. The common terminal between condenser 66 and resistor 81 is connected to bus 140 between resistors 76 and 77 through a grid return resistor 82 by a lead 83. Cathode 73 of diode 69 is connected directly to ground.

In function and fundamental operation, the second double diode limiting stage 70 is identical with the initial double diode limiting stage 30, hereinabove described, and improves the squareness of the wave shape.

Amplifying stage 90 comprises an electron tube 84 having a control grid 85, an anode 86, a cathode 87, a suppressor grid 88, which is connected to the cathode 87, and a screen grid 89. Anode voltage is provided anode 86 by the power source 100 through the voltage supply bus 120, which bus is connected to ground through a load resistor 92, a cathode resistor 93, and the electron tube 84. Unidirectional voltage is provided the screen grid 89 through a conducting lead 94 which is connected to the regulated voltage bus 130. The operation of this second linear amplifier 90 is basically the same as the linear amplifier 50 hereinbefore described. For example, when the square wave voltage from the second limiting stage 70, which is impressed upon the control grid 85 of tube 84, is positive with respect to its zero reference, increased current flows from the anode voltage supply bus 120 through the load resistor 92, the tube 84, and cathode resistor 93, thereby causing the voltage at the anode 86 to decrease while the voltage at the cathode 87 increases. When the square wave voltage at the control grid 85 of tube 84 is negative with respect to the zero reference, the current flowing from the anode voltage supply bus 120 through the load resistor 92, the tube 84, and cathode resistor 93 decreases, thereby causing the voltage appearing at the anode 86 to increase while the voltage at the cathode 87 decreases. The voltage appearing at the cathode 87 of tube 84 is in phase with the voltage applied to the control grid 85 and provides the desired inverse current feedback, thereby improving the frequency response characteristic of the amplifier 90. Condenser 95 and lead 96 which interconnects cathode 87 of tube 84 and cathode 57 of tube 53 of amplifier 50 constitutes a feedback network. With this network the square wave voltage appearing at the cathode 87 of tube 84 is employed as a positive feedback voltage which will be impressed across the cathode resistor 65 of tube 53 in amplifier 50 for effecting an improvement in the verticality of the square wave output appearing at the anode 86 of the tube 84.

As hereinbefore stated, waveform shaping units B and D are functionally, operatively, and physically similar. Unit D, therefore, will be comprised of an initial double diode limiting stage, identified generally in the drawings by the numeral 30a, a linear amplifying stage 50a, a second double diode limiting stage 70a, and a second linear amplifying stage 90a. Each of these stages embody components identical to those components which comprise double diode limiting stage 30, linear amplifying stage 50, a second double diode limiting stage 70, and second linear amplifying stage 90.

The square wave voltage developed by unit D will appear at anode 86a of tube 84a of the second linear amplifying stage 90a.

The two square wave voltages produced by the waveform shaping units B and D are applied to a novel summing amplifier E which comprises a combining amplifier circuit 101 and a metering circuit 102. In association, the two vacuum tube circuits comprising the combining amplifier circuit 101 and the metering tube circuit 102 develop a direct current whose average value is linearly proportional to the phase difference between the two square wave voltages supplied by the waveform shaping units B and D. This direct current developed by the summing amplifier E is then transmitted to the linearly calibrated phase angle meter G, as will be described hereinafter in greater detail. Meter G displays the magnitude of the phase difference as computed by the action of the combining amplifier circuit 101 and metering tube circuit 102. Phase angle meter G utilized herein is a milliammeter of conventional construction and operation and of the type well known to those skilled in the art.

The combining amplifier circuit 101 includes an electron tube 103 comprising, within a single envelope, two triodes 104 and 105, with triode 104 having an anode 106, a control grid 107, and a cathode 108, and with triode 105 having an anode 109, a control grid 111, and a cathode 112. Cathodes 108 and 112 are interconnected by a conductive lead 113 and together are connected to ground by a cathode load resistor 114. Anodes 106 and 109 are interconnected by connector lead 115. Anode voltage is furnished from power supply source 100 to parallel connected anodes 106 and 109 by the voltage supply bus 120 through a lead 116. Positive voltage is afforded the control grids 107 and 111 through leads 117 and 118 and grid return resistors 119 and 121. Improved stability of the summing amplifier E is realized by the application of this positive grid voltage which indirectly controls the amount of inverse current feedback provided in the circuit by allowing the use of a larger cathode resistor. Positive grid voltage causes a larger quiescent cathode voltage to exist across the cathode load resistor 114 with a corresponding increase in inverse feedback action. Leads 117 and 118 connect to the regulated voltage bus 130 and power supply source 100 in a manner to be hereinafter described.

The metering tube circuit 102 consists of an electron tube 122 comprising two triodes 123 and 124 within a single envelope. Triode 123 comprises an anode 125, a control grid 126, and a cathode 127, and triode 124 similarly includes an anode 128, a control grid 129, and a cathode 131. Cathodes 127 and 131 are interconnected by a lead 132 which connects to the cathode load resistor 114 of the combining amplifier circuit 101. A lead 133 interconnects anodes 125 and 128 and connects to the phase angle meter G. Anode voltage is provided these parallel connected anodes by regulated bus 130 through a lead 134 and phase angle meter G. A grounded by-pass condenser 135, which serves to compensate for the inductance of the phase angle meter G in averaging the higher frequency current pulses, is connected to lead 133 between phase meter G and the anodes 125 and 128. Bias voltage is afforded control grids 126 and 129 of tube 122 by leads 136 and 137 which are connected to the common lead 117. Lead 117, as stated hereinbefore, is connected to the regulated voltage bus 130 and power supply source 100 in a manner to be described.

With the combining amplifier 101 and the metering tube circuit 102 connected in the manner described and functioning under quiescent conditions, wherein no square wave voltages are being applied by the waveform shaping units, the combining amplifier is conductive, with current flowing from the anode voltage bus 120 to ground through lead 116, the two triodes 104 and 105 in parallel, and the unbypassed cathode resistor 114. The positive potential developed across the cathode resistor 114 is applied to the cathodes 127 and 131 of tube 122 by the lead 132, and is of sufficient magnitude to render the metering tube circuit 102 non-conductive. Thus, in the quiescent condition, no anode current flows in the metering tube circuit 102 and the phase angle meter G remains in its zero position.

The square wave voltages developed by the waveform shaping units B and D are applied to control grids 107 and 111 of triodes 104 and 105 of tube 103 in the combining amplifier 101. The output voltage of unit B is fed through lead 138 and coupling condenser 141 to grid 107 of triode 104 and the output of unit D is provided through lead 142 and a second coupling condenser 143 to control grid 111 of triode 105. The operation of the summing amplifier E will be more readily understood if it is assumed initially that the two square wave voltages applied to the control grids 107 and 111 of triodes 104 and 105 of tube 103 differ in phase by 180 degrees. Under this condition, the voltage impressed upon control grid 107 will be positive when the voltage impressed upon the control grid 111 is negative. Anode current flowing from the anode voltage bus 120 to ground through the triode 104 and the cathode resistor 114 is thereby increased, whereas, the anode current flowing from the anode voltage bus 120 to ground through the triode 105 and the cathode resistor 114 is cut-off. With properly assigned operating characteristics, the increase in current flowing through triode 104 is greater than the decrease in current flowing through triode 105 with the total current flowing through the cathode resistor 114 being larger than its steady state or quiescent condition. The positive potential appearing across the cathode resistor 114 maintains the metering tube circuit 102 at cut-off with zero current flowing through the phase angle meter G. Now, assume the square wave voltages developed by the waveform shaping units B and D applied to control grids 107 and 111 of triodes 104 and 105 are in-phase. During one-half the cycle both grids are driven positively; during the other one-half cycle both grids are driven negatively. With positive potentials applied to both control grids 107 and 111, anode current flowing from the anode supply bus 120 is increased through both triodes 104 and 105 with a corresponding increase in current flowing through the cathode load resistor 114. Application of the increased positive potential across cathode resistor 114 to the metering tube circuit 102 cannot affect its operation for the reason that tube 122 was in its non-conductive condition. During the one-half cycle in which both control grids are driven negatively, anode current flowing from the anode supply bus 120 is decreased through both triodes 104 and 105 and the common cathode load resistor 114. The decreased potential appearing across cathode load resistor 114 decreases the bias voltage applied to tube 122 which is sufficient to trigger the metering tube circuit 102 into conduction. Anode current flows from the regulated voltage bus 130 through the phase angle meter G and the metering tube circuit 102. The tube 122 of metering tube circuit 102 remains in this conductive condition during the period of time in which the control grids 107 and 111 of tube 103 are simultaneously negative relative to their quiescent condition. Thus, anode current flow through the phase angle meter G is initiated and remains flowing during that portion of the cycle in which control grids 107 and 111 of the combining amplifier circuit 101 are both driven negatively by the square wave voltages developed by the waveform shaping units B and D. As the phase difference between the square wave voltages varies from zero to 180 degrees, the time duration of the conductive condition of the metering tube circuit 102 relative to the time duration of one cycle of the applied voltages from the waveform shaping units B and D decreases linearly with the change in phase angle. Anode current flowing in the metering tube circuit 102 appears in the form of pulses of constant amplitude the width of which is linearly proportional to the phase angle between the applied signals. Thus, the average value of the anode current pulses is linearly proportional to the phase difference of the applied voltages. These pulses of anode current flowing in the metering tube circuit 102 are averaged by the phase angle meter G, thereby permitting the use of a phase angle meter G which is linearly calibrated from 0 to 180 degrees.

The two square wave voltages generated by the waveform shaping units B and D, in addition to being fed to the summing amplifier, are also supplied to the phase direction circuit F which circuit serves to determine the direction of any phase angle existing between the applied voltages. The phase direction circuit F consists of two electron tubes 151 and 152 and associated circuitry conductively arranged to provide a switching, or "flip-flop," action in a novel circuit having two conditions of stable equilibrium. Selection of one or the other of the conditions of stable equilibrium is controlled by the direction of the phase angle existing between the applied voltages, which direction is indicated by the phase direction indicator H.

Tube 151 of phase direction circuit F includes a cathode 153, a first control grid 154, a screen grid 155, a second control grid 156, and an anode 157; the companion tube 152, being of similar construction, includes a cathode 158, a first control grid 161, a screen grid 162, a second control grid 163, and an anode 164. Anode voltage from the power supply source 100 is furnished the anodes 157 and 164 from the anode voltage supply bus 120 through load resistors 165 and 166, respectively. Anode 157 of tube 151 is connected through a coupling resistor 167 to the common terminal of the first control grid 161 of tube 152 and a grounded grid return resistor 168. Anode 164 of tube 152 is connected through a resistor 171 to a common terminal of the first control grid 154 of tube 151, a grounded grid return resistor 172, and a dropping resistor 173. Through a lead 174 connected to the regulated voltage bus 130 unidirectional voltage is furnished the interconnected screen grids 155 and 162 by power supply source 100. Cathodes 153 and 158 of tubes 151 and 152 are interconnected by a lead 175 and connected to ground through a common cathode resistor 176. The second control grids 156 and 163 of tubes 151 and 152 are interconnected to the common terminal of a resistor 177 and a grounded resistor 178, which resistors effect a voltage divider network.

The principle of operation of the phase direction circuit F is more readily understood by noting that this circuit, in effect, comprises two symmetrical networks which, for clarity, are designated generally on the drawings by numerals 179 and 180. Network 179, as shown, includes the load resistor 165, the coupling resistor 167, the tube 151, and the grid return resistor 172, whereas, network 180 includes the load resistor 166, the coupling resistor 171, the tube 152, and the grid return resistor 168. With corresponding resistors of networks 179 and 180 being assigned equal values and tubes 151 and 152 being similar, the networks 179 and 180 are electrically symmetrical. The symmetrical circuit arrangement of the phase direction circuit F has two conditions of stable equilibrium: one condition existing when tube 151 of network 179 is conductive with tube 152 of network 180 non-conductive or cut-off, the other condition existing when tube 151 of network 179 is non-conductive with tube 152 of network 180 being conductive. Selection of one or the other of the two stable conditions is made by the relative phase direction of the periodic square wave voltages developed by the waveform shaping units B and D in a manner hereinafter to be described.

The square wave voltage developed by the waveform shaping unit B, hereinafter to be denoted "the reference voltage," is applied to the second control grids 156 and 163 of tubes 151 and 152, respectively, by a lead 181 through the resistor 177. By the proper choice of values for the circuit components, particularly resistors 177 and 178, the magnitude of the reference voltage impressed upon control grids 156 and 163 is sufficient to provide a switching action, or time selection, of the anode current flowing through the tubes 151 and 152. When the reference voltage from the waveform shaping unit B is positive with respect to its zero reference, or D.-C. component, anode current is allowed to flow through either tube 151 or 152. It is therefore apparent that a reference voltage which is positive with respect to its zero reference, when applied to the second control grids 156 and 163 of tubes 151 and 152, respectively, will permit either tube 151 or tube 152 to become conductive, but provides absolutely no selection between the two. A reference voltage negative with respect to its zero reference when applied to the second control grids 156 and 163 prevents anode current flow through either tube 151 or 152 but allows screen current to flow in both the tubes 151 and 152 from the power supply source 100 to ground through the regulated voltage bus 130, the interconnected screen grids 156 and 163, and the common cathode resistor 176. This current flow through the screen grid circuits during the negative one-half cycle of the reference voltage serves to maintain the voltage appearing across the common cathode resistor 176 substantially constant during the complete reference voltage cycle. It is understood that the terms "conductive" and "conducting" when used herein denote, in all cases, anode current flow and not screen current flow.

The square wave voltage developed by the waveform shaping unit D, hereinafter to be denoted "the comparison voltage," is applied to the first control grid 154 of tube 151 through resistor 173 and a coupling condenser 182. The instantaneous polarity of the comparison voltage with respect to its zero reference selects which of the two tubes 151 or 152 shall become conductive at the instant the reference voltage, supplied by the waveform shaping unit B and applied to the second control grids 156 and 163, goes positive. Since the phase direction circuit F has two conditions of stable equilibrium, network 179 is either conductive or non-conductive while network 180 assumes an opposite status. Upon initiation of anode current flow in either network 179 or 180, selection of which of these networks will become conductive is determined by the polarity of the comparison voltage at the instant the reference voltage goes positive. Anode current continues to flow in that network during the complete one-half cycle that the reference voltage is positive irrespective of the subsequent change in polarity of the comparison voltage at the completion of its positive one-half cycle. But during the negative one-half cycle of the reference voltage, as shown above, anode current flows in neither network regardless of the polarity of the comparison voltage. It, therefore, becomes apparent that an independent phase direction determination will be made every cycle at the reference voltage frequency at the instant that the reference voltage goes positive with respect to its zero reference. Since the comparison voltage may be either positive or negative at the instant the reference voltage goes positive, it will be initially assumed that the polarity of the comparison voltage is positive with respect to its zero reference at the instant either of the symmetrical networks, 179 or 180, are allowed to become conductive by the application of the positive leading edge of the reference voltage. At the instant the reference voltage goes positive, the positive comparison potential applied to the first control grid 154 of tube 151 causes an anode current to flow through network 179. Anode current flows from the power supply source 100 through the anode supply bus 120 and to ground through the load resistor 165, the tube 151, and the common cathode resistor 176. A greater potential drop appears across load resistor 165 as a result of the flow of anode current through network 179. Since the anode 157 of tube 151 is connected to the first control grid 161 of tube 152 through the coupling resistor 167, this increased potential drop across the load resistor 165 lowers the potential at both anode 157 of tube 151 and first control grid 161 of tube 152. This drop in potential appearing at the first control grid 161 decreases any anode current flowing through tube 152 of network 180, which, in turn, lowers the potential drop appearing across the load resistor 166 of network 180. With the anode 164 of tube 152 connected to the first control grid 154 of tube 151 through the coupling resistor 171, the increased potential at anode 164 causes an increase in potential at the first control grid 154 of tube 151. With a higher grid potential on the tube 151, the anode current flowing in this tube is increased. This condition of instability prevails and continues to drive the operation of networks 179 and 180 until tube 151 is conducting at saturation and tube 152 is cut off. With the network in this status, the magnitude of the positive potential appearing at the first control grid 154, as a result of the voltage divider action of the coupling resistor 171 and the grid return resistor 172, is sufficient to maintain the network 179 conducting at saturation during the complete positive one-half cycle of the reference voltage although the polarity of the comparison voltage thereafter becomes negative. Thus, it becomes apparent that network 179 will exist in its conductive status whereas network 180 will be in its non-conductive status when the square wave comparison voltage supplied by the waveform shaping unit D has a leading phase characteristic relative to the square wave reference voltage supplied by the waveform shaping unit B.

Assume now that the comparison voltage is lagging in phase with respect to the reference voltage, that is, the comparison voltage is negative with respect to its zero reference at the instant the reference voltage goes positive with respect to its zero reference. With the comparison voltage, which is applied to the first control grid 154 of tube 151, then being negative at the instant when both tubes 151 and 152 are allowed to become conductive by the application of a positive reference voltage applied to second control grids 156 and 163 of tubes 151 and 152, respectively, the flow of anode current from power supply source 100 through the anode voltage supply bus 120 to ground through the load resistor 165, tube 151, and common cathode resistor 176 is thereby reduced. This reduced current flow through the load resistor 165 results in a lower potential drop appearing across the load resistor which raises the potential existing at anode 157 of tube 151. With the anode 157 of tube 151 being cross-connected to the first control grid 161 of tube 152, the rise in potential at anode 157 causes the potential of the first control grid 161 to also rise. This increased potential at the first control grid 161 of tube 152 increases the current flow from the power supply source 100 through the anode voltage supply bus 120 to ground through the load resistor 166, tube 152, and the common cathode resistor 176. The decreased potential appearing at the anode 164 of tube 152, as a result of the increased voltage drop across the load resistor, causes a further decrease in potential existing at the first control grid 154 of tube 151. This action, as in the aforementioned case where the comparison voltage has a leading characteristic, augments the comparison signal applied to the first control grid 154 and is cumulative. This condition of instability continues to drive networks 179 and 180 until tube 152 is conducting at saturation and tube 151 of network 179 is cut off. With the networks in this status and network 180 conducting at saturation, the potential applied to the first control grid 154 of tube 151 through the action of the coupling resistor 171 and the grid return resistor 172 biases the tube 151 sufficiently below cut-off that the subsequent change in polarity of the comparison voltage during the period when the reference voltage is positive is ineffectual to trigger the tube 151 of network 179 into conduction.

The directional phase characteristic of the square wave signals developed by the waveform shaping units B and D are exhibited by a phase direction indicator H, comprising a neon tube 183 and a current limiting resistor 184. Neon tube 183 and resistor 184 are connected in series and are together connected across the load resistor 166 in network 180 of the phase direction circuit F. As hereinbefore mentioned, the phase characteristic is indicated by the status of networks 179 and 180, for example, when the signal from waveform shaping unit D leads the signal from waveform shaping unit B, network 179 is in its conductive status with network 180 being cut-off, whereas, when the signal from unit D lags the signal from unit B an opposite condition exists with network 179 being non-conductive while network 180 is conductive. The status of networks 179 and 180 may be determined by monitoring the potential drop appearing across the load resistor 166 in network 180. Thus, with network 180 conductive the increased potential drop across the load resistor 166, as a result of the anode current flow, is sufficient to ionize the neon tube 183. When network 180 is non-conductive, thus signifying a leading phase characteristic of the signal developed by the waveform shaping unit D, the potential drop existing across load resistor 166 is insufficient to ignite neon tube 183.

Power supply source 100, comprising a battery 185 with associated resistors 186, 187, 188, which resistors are provided for properly maintaining necessary potentials at a predetermined value, furnishes the required unidirectional energy for all circuits. The positive terminal of the battery 185 is connected both to the anode voltage supply bus 120 through a lead 189 and to the regulated voltage bus 130 through the dropping resistor 186 and lead 191. Resistor 187 is connected in series with the battery 185 and resistor 186, with the common terminal of the resistors 187 and 188 being connected to ground. The ungrounded terminal of resistor 188 is connected both to the negative terminal of the battery 185 and to a lead 192, through which lead negative voltage is furnished the negative bias bus 140. Power supply source 100 through the regulated voltage bus 130 and a voltage divider network comprising resistors 193, 194, and potentiometer 195, and the lead 117 supplies the required positive potentials to the control grids 107 and 111 of triodes 104 and 105 of the combining amplifier 101 and control grids 126 and 129 of triodes 123 and 124 of the metering tube circuit 102. Regulated voltage bus 130 is connected to ground through the resistors 193, 194, and the potentiometer 195 with a bypass condenser 196, which condenser is employed to prevent interaction between the combining amplifier 101 and the metering tube circuit 102, being connected across the resistor 194 and potentiometer 195. Potentiometer 195 provides a zero adjustment for the phase angle meter G by allowing variations in the grid voltages as applied to both the combining amplifier 101 and metering tube circuit 102. With the applied square wave voltages from the waveform shaping units B and D in-phase, potentiometer 195 is adjusted in a manner to indicate a corresponding zero phase angle by the meter G.

While certain preferred embodiments of the invention have been specifically disclosed it is understood that the invention is not limited thereto as many variations will be readily apparent to those skilled in the art and the invention is to be given its broadest possible interpretation within the terms of the following claims.

What I claim is:

1. Apparatus for measuring and indicating phase difference and direction between two alternating voltages of substantially the same frequency, comprising first and second waveform shaping circuits for converting said voltages into corresponding first and second signals having substantially square waveforms, a phase direction circuit having two stable conductive conditions, said circuit comprising first and second electron discharge devices each having an anode, first and second control grids, and a cathode, a source of potential connected to said anodes, means interconnecting the anode of each of said electron discharge devices with the first control grid of the other of said electron discharge devices, means for applying said first signal simultaneously to one of said first and second control grids of each of said electron discharge devices, and means for applying said second signal to the other of said first and second control grids of only the first of said electron discharge devices.

2. Apparatus for measuring and indicating phase difference and direction between two alternating voltages of substantially the same frequency, comprising first and second waveform shaping circuits for converting said voltages into corresponding first and second signals having substantially square waveforms, a phase direction circuit having two stable conductive conditions, said circuit comprising first and second electron discharge devices each having an anode, first and second control grids, and a cathode, a source of potential connected to said anodes, means interconnecting the anode of each of said electron discharge devices with the first control grid of the other of said electron discharge devices, biasing means connected between said cathodes and a negative terminal of said source of potential, means for applying said first signal simultaneously to one of said first and second control grids of each of said electron discharge devices, means for applying said second signal to the other of said first and second control grids of only the first of said electron discharge devices, means for alternately allowing conductive and non-conductive conditions in reverse relationship in said electron discharge devices, and means associated with one of said electron discharge devices for establishing conductive conditions in either of said electron discharge devices.

3. Apparatus for measuring and indicating phase difference and direction between two alternating voltages of substantially the same frequency, comprising first and second waveform shaping circuits for converting said voltages into corresponding first and second signals having substantially square waveforms, a phase direction circuit having two stable conductive conditions, said circuit comprising first and second electron discharge devices each having an anode, first and second control grids, and a cathode, a source of unidirectional potential connected to said anodes, means interconnecting the anode of each of said electron discharge devices with the first control grid of the other of said electron discharge devices, means for applying said first signal to the first control grid of one of said electron discharge devices, means for applying said second signal simultaneously to the second control grids of said first and said second electron discharge devices, and indicating means associated with one of said electron discharge devices for displaying conductive conditions of said electron discharge device.

4. Apparatus for measuring and indicating phase difference and direction between two alternating voltages of substantially the same frequency, comprising first and second waveform shaping circuits for converting said voltages into corresponding first and second signals having substantially square waveforms, a phase direction circuit having two stable conductive conditions, said circuit comprising first and second electron discharge devices each having an anode, first and second control grids, and a cathode, a source of potential connected to said anodes, means interconnecting the anode of each of said electron discharge devices with the first control grid of the other of said electron discharge devices, biasing means connected between said cathodes and a negative terminal of said source of potential, means for applying said first signal to the first control grid of one of said electron discharge devices, means for applying said second signal simultaneously to the second control grids of said first and said second electron discharge devices, means associated with one of said electron discharge devices for establishing conductive conditions in either of said electron discharge devices, and indicating means associated with at least one of said electron discharge devices for exhibiting the conductive condition of that electron discharge device.

References Cited in the file of this patent

UNITED STATES PATENTS

| 2,287,174 | Heising | June 23, 1942 |
| 2,605,402 | Coleman | July 29, 1952 |

FOREIGN PATENTS

| 118,255 | Switzerland | Dec. 16, 1926 |

OTHER REFERENCES

"An Electronic Phasemeter," by Florman & Tait, Proceedings of the IRE, vol. 37, No. 2, February, 1949, pp. 207–210.

"Instruments," vol. 22, pp. 40–41, Jan. 1949.